US007567868B2

(12) United States Patent
Rusanen

(10) Patent No.: US 7,567,868 B2
(45) Date of Patent: Jul. 28, 2009

(54) GUIDANCE SYSTEM

(75) Inventor: Niko Rusanen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/889,965

(22) Filed: Aug. 17, 2007

(65) Prior Publication Data

US 2008/0010013 A1 Jan. 10, 2008

Related U.S. Application Data

(63) Continuation of application No. PCT/FI2006/000049, filed on Feb. 14, 2006.

(30) Foreign Application Priority Data

Mar. 8, 2005 (FI) .................................. 20050250

(51) Int. Cl.
*G01C 21/00* (2006.01)

(52) U.S. Cl. ......................... 701/200; 701/35; 701/210; 187/396

(58) Field of Classification Search ................... 701/35, 701/200, 209, 211, 214, 210; 704/275, 246, 704/251; 187/392, 396
See application file for complete search history.

(56) References Cited

U.S. PATENT DOCUMENTS

| | | | |
|---|---|---|---|
| 4,674,937 | A | 6/1987 | Warshauer |
| 4,972,926 | A | 11/1990 | Tsuji et al. |
| 6,615,175 | B1 | 9/2003 | Gazdzinski |
| 6,865,539 | B1 | 3/2005 | Pugliese, III |
| 6,988,071 | B1 | 1/2006 | Gazdzinski |
| 2002/0077749 | A1 | 6/2002 | Doi |
| 2004/0060777 | A1 | 4/2004 | Takeuchi |
| 2004/0222047 | A1 | 11/2004 | DiFranza et al. |
| 2005/0033634 | A1 | 2/2005 | Pugliese, III |

FOREIGN PATENT DOCUMENTS

| | | | |
|---|---|---|---|
| JP | 2002-234674 | A | 8/2002 |
| WO | WO-00/40496 | A1 | 7/2000 |

*Primary Examiner*—Gertrude Arthur Jeanglaud
(74) *Attorney, Agent, or Firm*—Birch, Stewart, Kolasch & Birch, LLP

(57) ABSTRACT

A guidance system and a method for guiding passengers in an elevator system. The elevator system including a number of elevators, receiving and allocating passenger's destination call data, and implementing data transfer between the elevator system and the guidance system. The guidance system storing guiding messages into the guidance system and a number of reproduction devices for reproducing the guiding messages in the elevator system. Stored in the guidance system are a number of guiding messages, of which number a guiding message corresponding to the route has been defined for at least one route in the elevator system, which guiding message can be reproduced along the route in question. In the method, a number of guiding messages are stored into the guidance system, of which number a guiding message corresponding to the route is defined for at least one route in the elevator system, which guiding message is reproduced along the route in question.

20 Claims, 1 Drawing Sheet

GUIDANCE SYSTEM

Figure 1:
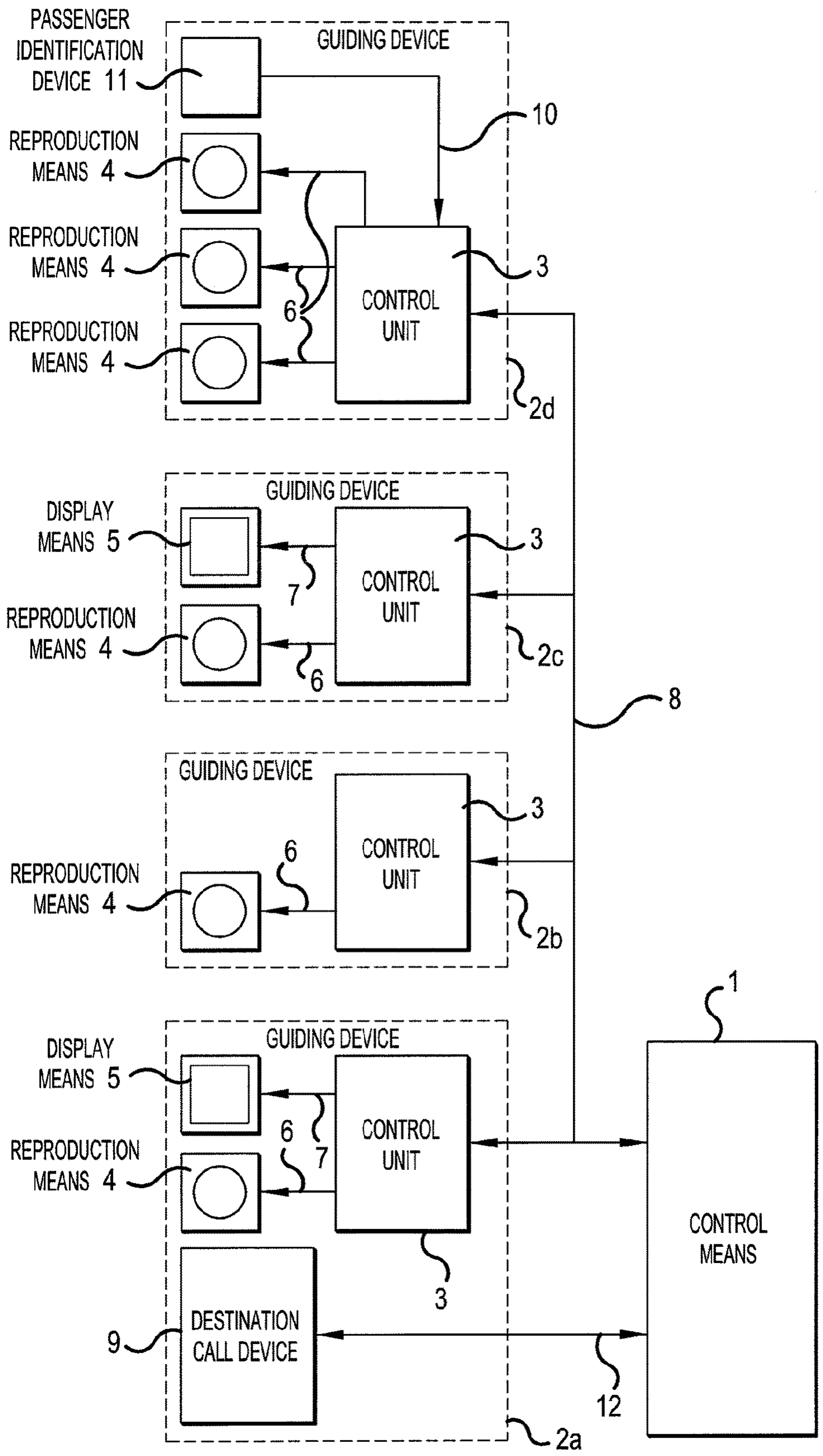

This application is a Continuation of copending PCT International Application No. PCT/FI2006/000049 filed on Feb. 14, 2006, which designated the United States, and on which priority is claimed under 35 U.S.C. § 120. This application also claims priority under 35 U.S.C. § 119(a) on Patent Application No(s). 20050250 filed in Finland on Mar. 8, 2005. The entire contents of each of the above documents is hereby incorporated by reference.

FIELD OF THE INVENTION

The present invention relates to a guidance system for an elevator system as defined in the preamble of claim 1 and to a method as defined in the preamble of claim 12.

BACKGROUND OF THE INVENTION

Tall multi-story buildings typically contain numerous elevators, which are arranged to form several elevator groups. Each elevator in the elevator group can take passengers to different floors or floor zones in the building. The operation of the elevators in the elevator groups is controlled by a set of control means receiving the calls entered by the passengers. The calls may be e.g. car calls given from inside an elevator car or landing calls given from different floors. Call arrangements have also been developed wherein the passenger selects the destination floor at the starting floor already before boarding the elevator. For example, U.S. Pat. No. 4,972,926 discloses a solution of this type, wherein both the entry of an elevator landing call and the definition of destination are implemented by pressing a button on a destination call device. Activated by the destination call entered by the passenger, the set of control means determines (allocates) a route that the passenger has to follow in order to reach the destination he/she has selected. In determining the route, the set of control means often utilizes different optimizing methods to optimize the route with respect to desired parameters. The route allocated by the set of control means may be a multistage route, which may comprise several sub-journeys using e.g. elevators, escalators and/or moving walk-ways. In simple routing solutions, the destination call is located on the same floor level, possibly in the same elevator lobby, as is served by the elevator implementing the route. In complex routing solutions, the building has to be provided with numerous display devices, fixedly mounted guide maps and/or other guidance devices to guide the passenger from the destination call device to the destination according to the route. In prior art, various alphanumeric codes are used in the guides of elevator systems to guide the passenger to the right elevator lobby and/or elevator. In traditional elevator systems, the elevator system uses an acoustic signaling device, such as e.g. an arrival gong, placed in the immediate vicinity of each elevator door, generally above it, to announce the arrival of an elevator at the floor in question to the passengers in the elevator lobby.

Prior-art guidance systems involve several problems. Alphanumeric guides often contain codes from which the passenger's route information is difficult to decipher or the codes do not provide sufficiently informative information to passengers. The guidance information may also be too abundant for an individual passenger to be able to find his/her route without difficulty. For the visually handicapped, traveling in elevator systems based on prior-art technology is often almost impossible. The sound signals announcing the arrival of an elevator at the floor are often identical for all elevators serving that floor and are primarily intended to indicate the arrival of each elevator at the floor. As the sound signals on the floor level are identical for different elevators, the elevator passenger can not find the elevator belonging to his/her route on the basis of the sound signals only. Due to insufficient guidance, in large building complexes the passenger often experiences uncertainty in the selection of the correct route and easily strays from the route leading to the destination floor.

OBJECT OF THE INVENTION

The object of the present invention is to overcome the above-mentioned drawbacks and to achieve a completely new type of solution for guiding elevator passengers in an elevator system, in which solution the passenger's needs are taken into account better than before.

An additional object of the invention is to achieve one or more of the following goals:

- to enable the presentation of guidance information of informative and/or advertising nature in an elevator system.
- to create a solution that will be easy to modify in changing conditions.
- to make it easier for e.g. visually or audially handicapped passengers to move in an elevator system.
- to enable faster traveling in an elevator system.

The present invention can be applied e.g. in office buildings, hospitals, shopping centers and airports, where people have to reach the destination easily and quickly.

BRIEF DESCRIPTION OF THE INVENTION

The system of the invention is characterized by what is disclosed in the characterization part of claim 1. The method of the invention is characterized by what is disclosed in the characterization part of claim 12. Other embodiments of the invention are characterized by what is disclosed in the other claims. Inventive embodiments are also presented in the description part and drawings of the present application. The inventive content disclosed in the application can also be defined in other ways than is done in the claims below. The inventive content may also consist of several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. Within the framework of the basic concept of the invention, features of different embodiments of the invention can be applied in conjunction with other embodiments.

The meanings of certain terms used hereinafter are defined below:

- the word "number" has the meaning of "one or more"
- the term "guiding message" has the meaning of "guiding sound and/or guiding image".

The invention concerns a guidance system for the guidance of passengers in a multi-route elevator system. The elevator system comprises a number of elevators, means for receiving passengers' destination call data and allocating the same as passenger route data, and data transfer means for implementing data transfer between the aforesaid elevator system and the aforesaid guidance system. The guidance system comprises means for storing guiding messages into the guidance system and a number of reproduction devices for reproducing the aforesaid guiding messages in the elevator system. Stored in the guidance system are a number of guiding messages, of which number a guiding message has been defined for at least one route in the elevator system, said guiding message corresponding to said route. The guiding message corresponding to the route can be reproduced along the route in question to guide passengers in the elevator system.

The invention also concerns a method for guiding passengers in a multi-route elevator system, which elevator system receives passengers' destination call data, allocates the said destination call data as passenger route data, and communicates via a data transfer means with a guidance system, which comprises means for storing guiding messages into the guidance system and a number of reproduction devices for reproducing said guiding messages in the elevator system. In the method, a number of guiding messages are stored in the guidance system, of which number a guiding message is defined for at least one route in the elevator system, which guiding message corresponds to the route in question and is reproduced along the route to guide passengers on the said route.

In an embodiment of the guidance system of the invention, the guiding message consists either completely or partly of a guiding sound, which can be reproduced along the route corresponding to the guiding message in question.

In an embodiment of the guidance system of the invention, the guiding sound used is a piece of music or an abridged version of a piece of music; a musical theme or an abridged version of a musical theme used by an enterprise or other community; a sound characteristic of a mechanical device or system; a sound characteristic of a living creature; and/or a sound characteristic of a natural phenomenon.

In an embodiment of the guidance system of the invention, at least one guiding message consists either completely or partly of a guiding image, which can be reproduced along the route corresponding to the guiding message.

In an embodiment of the guidance system of the invention, the guiding image used is an individual image, a series of images and/or a video image.

In an embodiment of the guidance system of the invention, the guiding message corresponding to the route allocated to the passenger can be reproduced in connection with the passenger giving destination call data via a destination call device.

In an embodiment of the guidance system of the invention, the guiding message corresponding to a route in the elevator system can be reproduced in the immediate vicinity of an elevator at least partially implementing the route in question.

In an embodiment of the guidance system of the invention, the guiding message corresponding to a route in the elevator system can be reproduced on at least one floor level in connection with an elevator that at least partly implements the said route stopping at the floor in question.

In an embodiment of the guidance system of the invention, the guiding image and guiding sound corresponding to at least one route in the elevator system have been selected from among alternatives in which an associative connection exists between the guiding image and the guiding sound.

In an embodiment of the guidance system of the invention, at least one guiding message has been formed from a video recording wherein both a guiding image and a guiding sound have been recorded simultaneously in connection with the same audiovisual event.

In an embodiment of the guidance system of the invention, the guiding message can be reproduced in a continuous reproduction process, from time to time and/or as controlled by an external stimulus.

In an embodiment of the method of the invention, the guiding message consists either completely or partly of a guiding sound, which is reproduced along the route corresponding to the guiding message in question.

In an embodiment of the method of the invention, the guiding sound used is a piece of music or an abridged version of a piece of music; a musical theme or an abridged version of a musical theme used by an enterprise or community; a sound characteristic of a mechanical device or system; a sound characteristic of a living creature; and/or a sound characteristic of a natural phenomenon.

In an embodiment of the method of the invention, the guiding message consists either completely or partly of a guiding image, which is reproduced along the route corresponding to the said guiding message.

In an embodiment of the method of the invention, the guiding image used is an individual image, a series of images and/or a video image.

In an embodiment of the method of the invention, the guiding message corresponding to the route allocated to the passenger is reproduced in connection with the passenger giving the destination call data via the destination call device.

In an embodiment of the method of the invention, the guiding message corresponding to a route in the elevator system is reproduced in the immediate vicinity of an elevator at least partially implementing the route in question.

In an embodiment of the method of the invention, the guiding message corresponding to a route in the elevator system is reproduced on at least one floor level in connection with an elevator that at least partly implements the said route stopping at the floor in question.

In an embodiment of the method of the invention, the guiding image and guiding sound corresponding to at least one route in the elevator system are selected from among alternatives in which an associative connection exists between the guiding image and the guiding sound.

In an embodiment of the method of the invention, at least one guiding message is formed from a video recording wherein both a guiding image and a guiding sound have been recorded simultaneously in connection with an audiovisual event.

In an embodiment of the method of the invention, the guiding message is reproduced in a continuous reproduction process, from time to time and/or as controlled by an external stimulus.

The present invention provides several advantages as compared to prior-art solutions. The invention makes it possible to produce guidance information that is clear and easy to recognize at different stages along the route. The invention also makes it easier for visually or audially handicapped persons to move in an elevator system. The swiftness of traveling is increased in many ways, among other things because the same guiding messages are reproduced sufficiently frequently at different stages along the routes and because the passenger can often decide the correct route on the basis of the guidance information only, without using a destination call device to give the destination. The guiding messages are also easy to modify, and various elements of informative or advertising nature can be added to them.

LIST OF FIGURES

In the following, the invention will be described in detail with reference to a few embodiment examples and the attached drawings, wherein FIG. 1 presents a guidance system according to the invention.

DETAILED DESCRIPTION OF THE INVENTION

FIG. 1 is a diagrammatic representation of a guidance system according to the invention, which comprises guiding devices 2a-2d, which are connected via a data transfer link 8 to a set of control means 1 controlling an elevator system. The set of control means 1 comprises means for controlling subassemblies of the elevator system, such as e.g. for controlling elevators and/or elevator groups. Moreover, the set of control means 1 comprises a destination call device 9, e.g. a key panel, for receiving passengers' destination calls, and means for allocating the said destination calls as route data.

The guiding devices 2a-2d contain a control unit 3 and a number of sound reproduction means 4 for the reproduction of guiding sounds. In the case illustrated in FIG. 1, the guiding devices 2a-2d additionally contain a display means 5 for the reproduction of guiding images. The control unit 3 contains a memory means for storing at least one guiding message into the guiding device 2. The guiding messages are stored into the memory means of the control unit 3 in conjunction with the commissioning of the elevator system, in conjunction with maintenance of the elevator system and/or during operation of the elevator system. The guiding messages can be stored into the guiding devices 2 over a data transfer connection, e.g. over data transfer link 8. The guiding messages are stored on the memory means of the control unit 3 as separate sound or image records and/or as paired audiovisual records containing both sound and image. When reproducing the guiding messages, the control unit 3 generates a sound signal 6 corresponding to the guiding message records stored on the memory means to produce guiding sounds on the sound reproduction means 4, and/or correspondingly, an image signal 7 to display guiding images on the display means 5. In simple guidance solutions where the guiding image is fairly unchangeable, the guiding image used may also be a photograph or a similar graphic image, icon or symbol, in which case no record of the guiding image needs to be stored on the memory means of the control unit 3 and likewise no image signal 7 has to be generated. Each guiding message is reproduced on one or more guiding devices in a continuous reproduction process, from time to time and/or as controlled by an external stimulus. The external stimulus may be e.g. an external signal 10 connected to the guiding device and/or a data message transferred to the guiding device via a data transfer connection, e.g. data transfer link 8. If the guiding message comprises both a guiding sound and a guiding image, the guiding sound and image in question can also be reproduced on the guiding device independently of each other, in other words, the guiding sound alone or the guiding image alone is reproduced, or both the guiding sound and the guiding image are reproduced simultaneously. In FIG. 1, the terminal device 11 represents a passenger identification device, e.g. a reader working on a radio frequency, for detecting a sensor carried by the passenger and generating an external signal 10 based on the identification. The identification device enables individual guidance information intended for the passenger to be presented in the guidance system. For example, handicapped passengers can be guided to a route that will serve their needs better than some other route alternatives with the same destination.

The guiding devices can be installed in the elevator system in the immediate vicinity of connecting galleries, escalators and/or elevators, e.g. on the floor levels above the elevator doors and/or in conjunction with the elevator cars. As shown in FIG. 1, one of the guiding devices is mounted in conjunction with the destination call device 9 (guiding device 2a in FIG. 1).

In the elevator system according to FIG. 1, the passenger gives his/her destination call data by using a destination call device 9. The passenger's destination call data is transmitted via a data transfer connection 12 to the set of control means 1, where the passenger's destination call data is allocated as the passenger's route data, whereupon the set of control means 1 sends to the guiding device 2a a command in the form of a data message to reproduce the guiding message corresponding to the route in question. On the basis of the aforesaid reproduction command, the guiding device 2a reproduces the guiding message corresponding to the route allocated to the passenger, who can reach his/her destination in the elevator system by following the said guiding message. In cases where the passenger already knows or can easily infer the content of the guiding message that will guide the passenger to the destination, the passenger need not necessarily give his/her destination call data via the destination call device. Such cases include e.g. situations where the passenger regularly visits the building in question or the guiding sound corresponding to the passenger's route can be easily guessed e.g. on the basis of the destination of the route. When the passenger is familiar with the guiding message that he/she will have to follow, he/she can start the journey and move e.g. into the entrance lobby to await an elevator belonging to his/her route. When the elevator arrives at the entrance lobby, the set of control means sends to the guiding device associated with that elevator a command to reproduce the guiding message corresponding to the route implemented by the elevator, whereupon the guiding message corresponding to the route is reproduced on the guiding device, guiding the passenger to the right elevator. It is advantageous to add to the guiding message a guiding image as well, which is reproduced beforehand on the guiding device associated with the elevator implementing the route to give advance information regarding the arrival of the elevator at the entrance lobby. Thus, the passenger can move closer to the right elevator in time to await the arrival of the elevator. At later stages of the route, the same guiding message is repeated to the passenger via the guiding devices located along the route, guiding him/her to the desired destination.

According to the invention, the guiding sounds used are sounds that can be easily distinguished from each other. When the guiding message comprises both a guiding sound and a guiding image, the guiding sound and guiding image are so selected that an associative connection exists between the guiding image and the guiding sound corresponding to it. Table 1 presents a few examples of pairs of guiding sound and guiding image with an associative connection between them which may be used in the guiding messages.

TABLE 1

| Guiding sound/Guiding image |
|---|
| Country's national anthem/Country's flag |
| Company's musical theme/Company's product |
| Cackle/Hen |
| Train-whistle sound/Train |

It is obvious to the person skilled in the art that the invention is not limited to the embodiments described above, in which the invention has been described by way of example, but that many variations and different embodiments of the invention are possible within the scope of the inventive concept defined in the claims presented below.

The invention claimed is:

1. A guidance system for the guidance of passengers in a multi-route elevator system, which elevator system comprises:

a number of elevators; means for receiving passenger's destination call data and allocating the same as passenger route data said route data defining various elevators from amongst the number of elevators and different floors on which the various elevators are located, that should be used to reach the passengers' destination; and data transfer means for implementing data transfer between the aforesaid elevator system and the aforesaid guidance system, and which guidance system comprises means for storing guiding messages into the guidance system and a number of reproduction devices for reproducing the aforesaid guiding messages in the elevator system, wherein a number of guiding messages have been stored in the guidance system, of which number a guiding message has been defined for at least one route in the elevator system, said guiding message corresponding to said route, which guiding message can be reproduced along the route in question to guide passengers in the elevator system, and that the guiding message corresponding to the route allocated to the passenger can be reproduced in connection with the passenger entering destination call data via a destination call device.

2. A guidance system according to claim 1, wherein at least one the aforesaid guiding messages consists either completely or partly of a guiding sound, which guiding sound can be reproduced along the route corresponding to the guiding message in question.

3. A guidance system according to claim 1 or 2, wherein the guiding sound used is: a piece of music or an abridged version of a piece of music; a musical theme or an abridged version of a musical theme used by an enterprise or other community; a sound characteristic of a mechanical device or system; a sound characteristic of a living creature; and/or a sound characteristic of a natural phenomenon.

4. A guidance system according to claim 1, wherein at least one of the aforesaid guiding messages consists either completely or partly of a guiding image, which guiding image can be reproduced along the route corresponding to the guiding message.

5. A guidance system according to claim 4, wherein the aforesaid guiding image used is an individual image, a series of images and/or a video image.

6. A guidance system according to claim 1, wherein the guiding message corresponding to a route in the elevator system can be reproduced in the immediate vicinity of an elevator at least partially implementing the route in question.

7. A guidance system according to claim 1, wherein the guiding message corresponding to a route in the elevator system can be reproduced on at least one floor level in connection with an elevator that at least partially implements the said route stopping at the floor in question.

8. A guidance system according to claim 4, wherein the guiding image and guiding sound corresponding to at least one route in the elevator system have been selected from among alternatives in which an associative connection exists between the guiding image and the guiding sound.

9. A guidance system according to claim 4, wherein at least one of the aforesaid guiding messages has been formed from a video recording wherein both a guiding image and a guiding sound have been recorded simultaneously in connection with the same audiovisual event.

10. A guidance system according to claim 1, wherein the aforesaid guiding messages can be reproduced in a continuous reproduction process, from time to time and/or as controlled by an external stimulus.

11. A method for guiding passengers in a multi-route elevator system, comprising: receiving passengers' destination call data; allocating the said destination call data as passenger route data said route data defining various elevators from amongst the number of elevators and different floors on which the various elevators are located, that should be used to reach the passenger's destination; communicating via a data transfer means with a guidance system, said guidance system comprising means for storing guiding messages into the guidance system and a number of reproduction devices for reproducing said guiding messages in the elevator system storing a number of guiding messages into the guidance system; defining among this number a guiding message for at least one route in the elevator system, said guiding message corresponding to the route in question; reproducing the guiding message corresponding to the route allocated to the passenger in connection with the passenger entering destination call data on a destination call device; and reproducing the guiding message corresponding to the aforesaid allocated route along the aforesaid allocated route to guide the passenger in the elevator system.

12. A method according to claim 11, wherein at least one of the aforesaid guiding messages consists either completely or partly of a guiding sound, which guiding sound is reproduced along the route corresponding to the guiding message in question.

13. A method according to claim 11 or 12, wherein the guiding sound used is: a piece of music or an abridged version of a piece of music; a musical theme or an abridged version of a musical theme used by an enterprise or community; a sound characteristic of a mechanical device or system; a sound characteristic of a living creature; and/or a sound characteristic of a natural phenomenon.

14. A method according to claim 11, wherein at least one of the aforesaid guiding messages consists either completely or partly of a guiding image, which guiding image is reproduced along the route corresponding to the guiding message in question.

15. A method according to claim 14, wherein the guiding image used is an individual image, a series of images and/or a video image.

16. A method according to claim 11, wherein the guiding message corresponding to a route in the elevator system is reproduced in the immediate vicinity of an elevator at least partially implementing the route in question.

17. A method according to claim 11, wherein the guiding message corresponding to a route in the elevator system is reproduced on at least one floor level in connection with an elevator that at least partly implements the said route stopping at the floor in question.

18. A method according to claims 14, wherein the guiding image and guiding sound corresponding to at least one route in the elevator system are selected from among alternatives in which an associative connection exists between the guiding image and the guiding sound.

19. A method according to claim 14, wherein at least one of the aforesaid guiding messages is formed from a video recording wherein both a guiding image and a guiding sound have been recorded simultaneously in connection with an audiovisual event.

20. A method according to claim 11, wherein the aforesaid guiding messages are reproduced in a continuous reproduction process, from time to time and/or as controlled by an external stimulus.

* * * * *